United States Patent
Gomanne et al.

(10) Patent No.: US 10,138,755 B2
(45) Date of Patent: Nov. 27, 2018

(54) DEVICE FOR DEICING A SEPARATOR NOSE OF AN AVIATION TURBINE ENGINE

(71) Applicant: SAFRAN AIRCRAFT ENGINES, Paris (FR)

(72) Inventors: Benoit Jean Henri Gomanne, Evry Gregy sur Yerres (FR); Michel Gilbert Roland Brault, Quincy sous Senart (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 420 days.

(21) Appl. No.: 14/783,263

(22) PCT Filed: Apr. 11, 2014

(86) PCT No.: PCT/FR2014/050883
§ 371 (c)(1),
(2) Date: Oct. 8, 2015

(87) PCT Pub. No.: WO2014/167259
PCT Pub. Date: Oct. 16, 2014

(65) Prior Publication Data
US 2016/0032762 A1 Feb. 4, 2016

(30) Foreign Application Priority Data
Apr. 11, 2013 (FR) ...................... 13 53296

(51) Int. Cl.
*F01D 25/02* (2006.01)
*F01D 25/24* (2006.01)
*F02C 7/047* (2006.01)

(52) U.S. Cl.
CPC ............ *F01D 25/02* (2013.01); *F01D 25/24* (2013.01); *F02C 7/047* (2013.01);
(Continued)

(58) Field of Classification Search
CPC .... F01D 25/02; F01D 2300/174; F01D 25/24; F02C 7/047; F05D 2230/21;
(Continued)

(56) References Cited

U.S. PATENT DOCUMENTS 4,860,534 A * 8/1989 Easley .................... F02C 7/047
244/53 B
5,400,984 A 3/1995 Arnold et al.
(Continued)

FOREIGN PATENT DOCUMENTS

GB 697093 A 9/1953
GB 986878 A 3/1965
(Continued)

OTHER PUBLICATIONS

International Search Report dated Jun. 30, 2014 in PCT/FR2014/050883 filed Apr. 11, 2014.

*Primary Examiner* — Woody Lee, Jr.
*Assistant Examiner* — Jesse Prager
(74) *Attorney, Agent, or Firm* — Oblon, McClelland, Maier & Neustadt, L.L.P.

(57) ABSTRACT

A device for deicing a separator nose of an aviation turbine engine, and including a separator nose for positioning downstream from a fan of the engine to separate annular channels for passing a primary stream and a secondary stream coming from the engine, and a casing fastened to the separator nose so as to extend it downstream, the casing having an inner shroud defining the outside of the primary stream flow passage, and including at least one air duct incorporated in the inner shroud so as to be formed integrally therewith, the air duct opening out downstream to an air feed and opening out upstream into the inside of the separator nose.

9 Claims, 2 Drawing Sheets

(52) U.S. Cl.
CPC ...... *F05D 2220/30* (2013.01); *F05D 2230/21* (2013.01); *F05D 2240/125* (2013.01); *F05D 2260/607* (2013.01); *F05D 2300/174* (2013.01); *Y02T 50/671* (2013.01); *Y02T 50/675* (2013.01)

(58) Field of Classification Search
CPC ............. F05D 2220/30; F05D 2220/32; F05D 2220/3217; F05D 2260/607; F05D 2300/174; F05D 2230/31
See application file for complete search history.

(56) References Cited

U.S. PATENT DOCUMENTS

| | | | |
|---|---|---|---|
| 8,192,148 B2* | 6/2012 | Guemmer | F02C 6/08 |
| | | | 415/144 |
| 9,759,088 B2* | 9/2017 | Belmonte | F01D 25/02 |
| 2003/0035719 A1 | 2/2003 | Wadia et al. | |
| 2011/0131945 A1 | 6/2011 | Vauchel et al. | |
| 2012/0192544 A1* | 8/2012 | Roby | F01D 25/02 |
| | | | 60/226.1 |
| 2012/0312924 A1* | 12/2012 | Rainous | B64D 15/00 |
| | | | 244/134 E |

FOREIGN PATENT DOCUMENTS

| | | |
|---|---|---|
| GB | 2 259 679 A | 3/1993 |
| JP | 2008-31998 A | 2/2008 |
| WO | 2010/012899 A2 | 2/2010 |

* cited by examiner

DEVICE FOR DEICING A SEPARATOR NOSE OF AN AVIATION TURBINE ENGINE

BACKGROUND OF THE INVENTION

The present invention relates to the general field of stream separator noses forming parts of aviation turbine engines of the two-spool bypass type. The invention relates more particularly to a device for deicing such separator noses.

In an aviation turbine engine of the two-spool bypass type, the flow passage for the primary stream (or hot stream) and the flow passage for the secondary stream (or cold stream) are separated downstream from the fan by a separator nose.

In order to optimize the weight of the engine, while conserving the same ratio between the sections of the primary and secondary stream flow passages, manufacturers seek to reduce the radii of these passages. In order in particular to reduce the inside radius of the secondary stream flow passage, it is advantageous to limit as much as possible the radial size of the connection zone between the separator nose and the structural casing situated downstream from the separator nose. Minimizing this radial size also presents an aerodynamic advantage by making it possible to increase the degree of colinearity between the primary and secondary streams.

Furthermore, the separator nose is an internal element of the engine that is particularly exposed to ice forming when flying in icing conditions. Under such conditions, air of high humidity and rain can penetrate into the inside of the engine and become deposited on the separator nose in the form of accumulations of ice, with the risk of such accumulations of ice becoming detached and damaging the compressor situated downstream in the flow passage for the primary stream.

In order to avoid ice accumulating on the separator nose, it is known to inject hot air into its inside, which hot air is taken from a compressor stage of the engine. This air is typically conveyed via pipes constituted by separate fittings passing through the casing and fastened to the separator nose in order to discharge hot air into it. Reference may be made in particular to Document US 2003/0035719, which describes an example of such a deicer device.

Nevertheless, known solutions for conveying the air that is to prevent ice accumulating on the separator nose are not compatible with reducing the radial size of the connection zone between the separator nose and the casing.

OBJECT AND SUMMARY OF THE INVENTION

There therefore exists a need to be able to have a device for deicing a separator nose while using a minimum amount of radial space.

This object is achieved by a device for deicing a separator nose of an aviation turbine engine, the device comprising a separator nose for positioning downstream from a fan of the engine to separate annular channels for respectively passing a primary stream and a secondary stream coming from the engine, and a casing fastened to the separator nose so as to extend it downstream, the casing having an inner shroud defining the outside of the primary stream flow passage, the casing including in accordance with the invention at least one air duct incorporated in the inner shroud so as to be formed integrally therewith, the air duct opening out downstream to an air feed and opening out upstream into the inside of the separator nose.

Incorporating the air duct in the inner shroud of the casing so that they form a single piece makes it possible to limit the radial space occupied by the separator nose. Compared with a prior art deicing solution, the air duct is docked with the separator nose in a manner that is incorporated with the docking of the inner shroud of the casing, thereby correspondingly limiting the radial space occupied by the assembly. In other words, incorporating the air duct in the inner shroud of the casing makes it possible to offset the fastening between the air duct and the separator nose downstream, thereby making it possible to share this docking between the duct and the separator nose.

Preferably, the casing is made by casting using a mold having a core occupying a location for the air duct. The casing may be made of a titanium alloy.

The air feed may be an air feed tube that is connected at an upstream end to an injection manifold. Under such circumstances, the casing may have six air ducts that are angularly spaced about from one another and that are connected to a single injection manifold.

The air duct may open out to the inside of a deicing cavity formed in the separator nose and opens out into the primary stream flow channel.

Advantageously, the air duct does not have any fastenings on the separator nose.

The invention also provides an aviation turbine engine including a deicer device as defined above.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
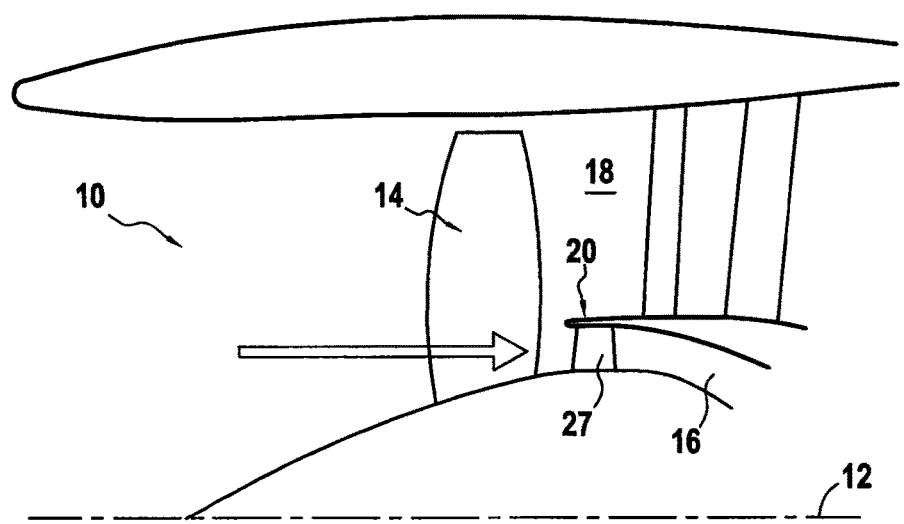
FIG. 1 is a fragmentary view in longitudinal section of an aviation turbine engine fitted with a deicer device in accordance with the invention.

FIG. 1 shows a portion of an aviation turbine engine 10 of the two-spool bypass type to which the invention applies.

In known manner, the engine 10 is axisymmetric about a longitudinal axis 12 and has an intake at its upstream end that receives outside air, this air being fed to a fan 14.

Downstream from the fan 14, the air is split between a primary stream flow passage (or channel) 16 and a secondary stream flow passage 18 arranged concentrically around the primary stream flow passage. These two passages 16 and 18 are separated from each other by a separator nose 20.

Figure 3:
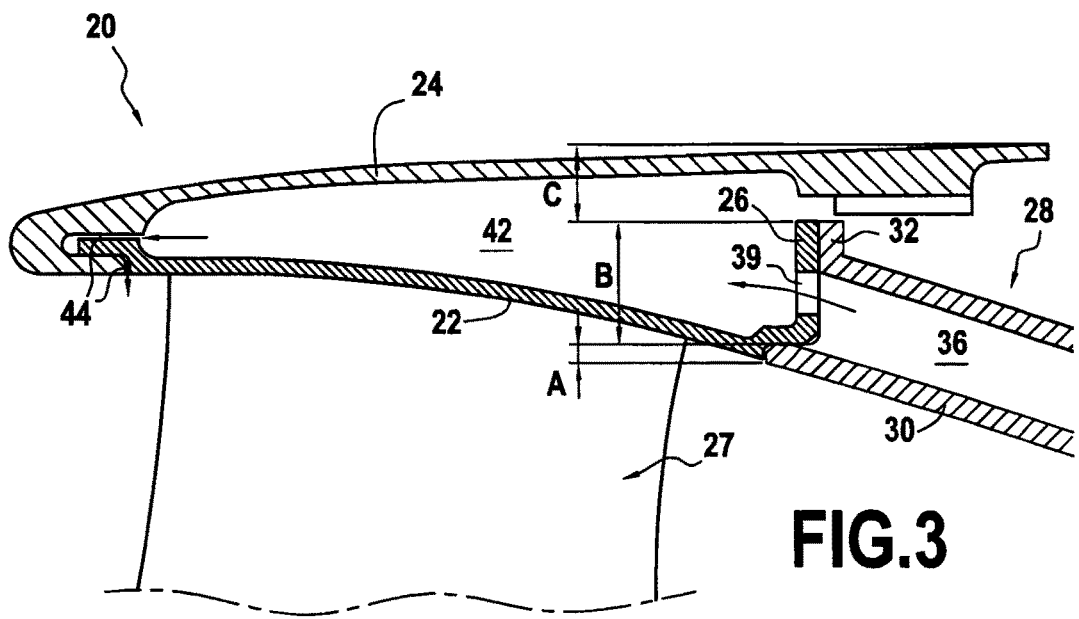
FIG. 3 is a longitudinal section view of FIG. 2.
Figure 2:
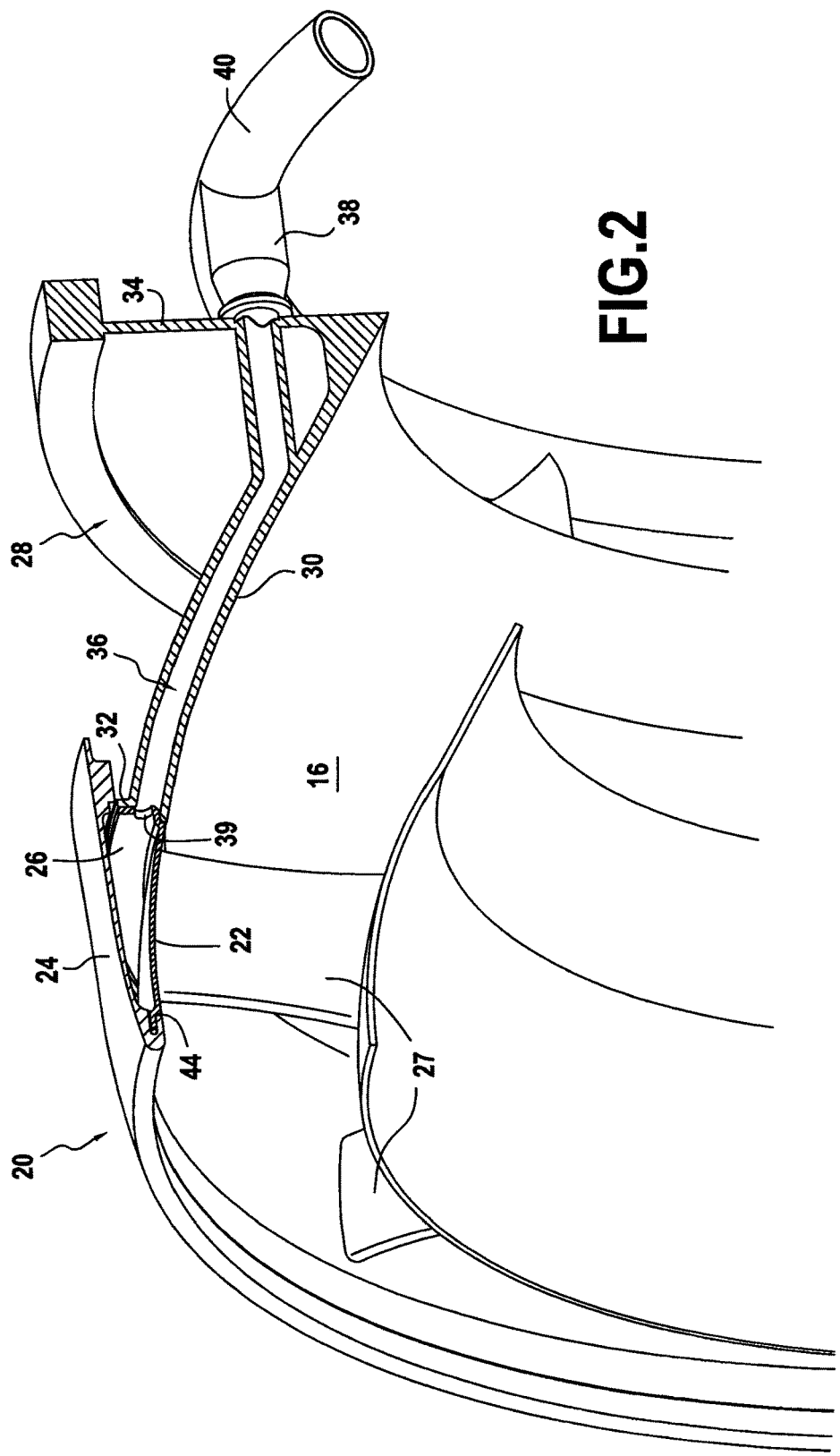
FIG. 2 is a perspective view of the FIG. 1 deicer device.

As shown in FIGS. 2 and 3, the separator nose 20 has a V-shaped longitudinal section and comprises an inner annular wall 22 defining the outside of the primary stream flow passage 16 and an outer annular wall 24 defining the inside of the secondary flow stream passage 18. At its downstream end, the inner wall 22 of the separator nose is extended by an annular flange 26 projecting radially towards the outer wall 24.

A row of inlet guide vanes (IGVs) 27 is fastened to the inner wall 22 of the separator nose.

Downstream, the separator nose 20 is fastened to a structural casing 28 having an inner shroud 30 defining the outside of the primary stream flow passage 16 extending the inner wall 22 of the separator nose downstream.

More precisely, at its upstream end, the inner shroud 30 of the structural casing 28 is extended by an upstream annular flange 32 that projects radially outwards and that is fastened to the flange 26 of the separator nose by nut-and-bolt type fastener systems (not shown in the figures) distributed around the longitudinal axis 12 of the engine.

At its downstream end, the inner shroud 30 of the casing is likewise extended by a downstream annular flange 34 projecting radially outwards in order to enable the casing to be fastened to another element of the engine (not shown in the figures).

Furthermore, an outer shroud (not shown in the figures) for fastening to the casing 28 serves to define the inside of the secondary stream flow passage 18, extending the outer wall 24 of the separator nose downstream.

In accordance with the invention, the casing 28 has at least one air duct 36 that is incorporated in its inner shroud 30 so as to be integral therewith, the air duct 36 opening out downstream towards an air feed tube 38 and opening upstream into the inside of the separator nose 20.

For this purpose, the casing 28 may be made by casting (e.g. a titanium alloy) using a mold that presents one or more cores occupying a corresponding number of locations for the air duct(s) 36 (the air duct 36 is molded together with the casing). By way of example, it is possible to use a lost wax casting method or a sand casting method. Alternatively, it is possible to have recourse to machine welding or to machining in the bulk of the material. As another alternative, if the air duct is constituted by one or more rectilinear portions, it may be drilled directly in the casing.

As a result, the air duct(s) 36 and the casing 28 form a single part. In particular, it should be observed that no such air ducts constitute separate fitted parts, and as a result there are no fastenings for fastening to the separator nose.

Still more precisely, the air duct 36 is formed so as to extend along the longitudinal axis 12 of the engine between the upstream flange 32 and the downstream flange 34 of the inner shroud 30 of the casing. The air duct 36 may also be formed in part with the inner shroud 30.

At its upstream end, the air duct 36 opens out into the inside of the separator nose by passing through an orifice 39 formed in the flange 26 of its inner wall 22, and at its downstream end it is connected via the downstream flange 34 of the inner shroud to an air feed tube 38.

The casing 28 preferably has a plurality of air ducts 36 (e.g. six) that are angularly spaced apart from one another around the longitudinal axis 12 of the engine. Each of these air ducts 36 opens out into an air feed tube 38, with the air feed tubes being connected to a common injection manifold 40 centered on the longitudinal axis 12 of the engine.

In known manner, the injection manifold 40 is itself fed with air taken from a compressor stage of the engine (not shown in the figures).

At their upstream ends, each of the air ducts 36 opens out into the inside of a deicing cavity 42 formed inside the separator nose 20 and leading in turn into the primary stream flow passage 16. The deicing cavity 42 is defined radially by the inner and outer walls 22 and 24, and axially by the flange 26.

The deicing cavity 42 leads into the primary stream flow passage 16 via air-passing slots 44 formed in the inner wall 22 and the outer wall 24 of the separator nose.

The operation of such a deicer device stems in obvious manner from the above description. Air that has been compressed (and that is thus hot) is taken from a compressor stage of the engine, and is distributed around the longitudinal axis of the engine by the injection manifold 40, from which it is injected into each air duct 36 by its air feed tube 38. The air flows along the air ducts 36 from downstream to upstream and into the deicing cavity 42 formed inside the separator nose 20. This hot air thus enables the walls 22 and 24 of the separator nose to be heated so as to avoid any ice forming in the event of flying in icing conditions. The air is then discharged into the primary stream flow passage 16 by passing through the air passing slots 44.

As shown more particularly in FIG. 3, such a deicer device occupies very little space radially. This space is made up as follows: space A corresponding to the radial space for docking the inner shroud 30 of the casing 28; space B corresponding to the radial space for docking the air duct 36; and space C corresponding to the radial space for docking the outer shroud (not shown) with the separator nose.

Such radial space is particularly small, in particular because the air duct 36 docks with the separator nose in a manner that is incorporated in the docking of the inner shroud 30 of the casing. Such a saving in radial space makes it possible to save weight for the engine for a given ratio between the sections of the flow passages.

The invention claimed is:

1. A device for deicing a separator nose of an aviation turbine engine, the device comprising:
    a separator nose positioned downstream from a fan of the engine to separate air from the fan into a primary stream flow passage and a secondary stream flow passage, the separator nose including an inner wall defining an outside of the primary stream flow passage and an outer wall defining an inside of the secondary stream flow passage, a downstream end of the inner wall including a flange extending radially towards the outer wall; and
    a casing fastened to the separator nose so as to extend the separator nose downstream, the casing having an inner shroud with an inner wall defining the outside of the primary stream flow passage,
    wherein the casing includes an air duct incorporated in the inner shroud so as to be formed integrally therewith so as to present a single piece, the air duct opening out downstream to an air feed and opening out upstream into an inside of the separator nose,
    wherein the air duct is delimited by the inner wall of the inner shroud and an outer wall of the inner shroud, the outer wall of the inner shroud including an upstream flange at an upstream end thereof that extends radially outwards which is fastened to the flange of the separator nose, and a downstream flange at a downstream end thereof, and
    wherein an upstream end of the inner wall of the inner shroud abuts a shoulder of the inner wall of the separator nose, the shoulder being located radially inward and upstream of a downstream face of the flange of the separator nose which abuts the upstream flange of the inner shroud.

2. The device according to claim 1, wherein the casing is made by casting using a mold having a core occupying a location for the air duct.

3. The device according to claim 2, wherein the casing is made out of a titanium alloy.

4. The device according to claim 1, wherein the air feed is an air feed tube that is connected at an upstream end to an injection manifold.

5. The device according to claim 4, wherein the casing includes six air ducts that are angularly spaced about from one another and that are connected to the injection manifold.

6. The device according to claim 1, wherein the air duct opens out to the inside of a deicing cavity formed in the separator nose and opens out into the primary stream flow channel.

7. The device according to claim 1, wherein the air duct does not have any fastenings on the separator nose.

8. An aviation turbine engine comprising:
a deicer device according to claim 1.

9. The device according to claim 1, wherein inlet guide vanes are fastened to the inner wall of the separator nose.

* * * * *